(12) United States Patent
Luczenbacher

(10) Patent No.: US 7,888,871 B2
(45) Date of Patent: Feb. 15, 2011

(54) COMPACT FLUORESCENT LAMP

(75) Inventor: János István Luczenbacher, Budapest (HU)

(73) Assignee: Skirtlight S.A., Vaduz (LI)

( * ) Notice: Subject to any disclaimer, the term of this patent is extended or adjusted under 35 U.S.C. 154(b) by 468 days.

(21) Appl. No.: 12/091,144

(22) PCT Filed: Oct. 26, 2005

(86) PCT No.: PCT/HU2005/000118

§ 371 (c)(1),
(2), (4) Date: Apr. 22, 2008

(87) PCT Pub. No.: WO2007/049083

PCT Pub. Date: May 3, 2007

(65) Prior Publication Data

US 2008/0284336 A1  Nov. 20, 2008

(51) Int. Cl.
*H01J 23/34*   (2006.01)
*H01J 63/04*   (2006.01)

(52) U.S. Cl. ............... 313/610; 313/493; 313/634; 313/318.01

(58) Field of Classification Search ............... 313/573, 313/493, 634, 318.01, 317, 610
See application file for complete search history.

(56) References Cited

U.S. PATENT DOCUMENTS

| 3,899,712 | A | 8/1975 | Witting |
| 3,953,761 | A | 4/1976 | Giudice |
| 4,281,271 | A * | 7/1981 | Young et al. ............... 313/493 |
| 4,503,360 | A | 3/1985 | Bedel |
| 4,694,215 | A | 9/1987 | Hofmann et al. |
| 5,128,590 | A | 7/1992 | Holzer et al. |
| 5,243,256 | A | 9/1993 | Holzer et al. |
| 5,751,104 | A | 5/1998 | Soules et al. |
| 6,064,155 | A | 5/2000 | Maya et al. |
| 6,459,204 | B1 | 10/2002 | Yan |
| 2002/0180352 | A1 | 12/2002 | Ilyes et al. |

* cited by examiner

*Primary Examiner*—Nimeshkumar D Patel
*Assistant Examiner*—Anthony T Perry
(74) *Attorney, Agent, or Firm*—Birch, Stewart, Kolasch & Birch, LLP

(57) ABSTRACT

Compact fluorescent lamp having a known base (1), a central hollow column (2), attached to the base (1), and the outer surface of which has a heat- and light-reflecting coating; a cap (3) closing the hollow column (2); and one or more light-radiating members (4) secured to the cap (3) and/or to the hollow column (2). The light-radiating members (4) start from the hollow column (2) and connect to electronic and electric elements and pass through the holes (3*b*) of the hollow column and/or the cap (3). The lamp further comprises a guide-ring (11) to support the light-radiating members (4) extending until or beyond the meeting boundary edge of the base (1) and the hollow column (2). The hollow column (2), the base (1), the cap (3) and the guide ring (11) are encompassed with the light-radiating members (4) extending in at least a direction parallel with the longitudinal axis of the lamp towards the base (1) and back and the light-radiating members (4) have curved sections (4*a*). The lamp is retrofit with conventional bulb sockets.

7 Claims, 12 Drawing Sheets

COMPACT FLUORESCENT LAMP

This Application is the National Phase Under 35 U.S.C. §371 of PCT International Application No. PCT/HU2005/000118 which has an International filing date of Oct. 26, 2005. The entire contents of all applications listed above are hereby incorporated by reference.

The invention relates to a compact fluorescent lamp provided with a base adapted to be fitted in any kind of known sockets, the compact fluorescent lamp is adapted for radiating light when fitted in the appropriate socket and connected to electric supply.

There are known compact fluorescent lamps in which the light-radiating member extending from the housing containing the integral starting electronics and the choking coil (control gear; starter and/or ballast, etc.) runs parallel with the longitudinal axis of the lamp then it makes a U-turn and—going again parallel with the longitudinal axis of the lamp—returns to the housing containing the electronics and securing the tube.

Similar U-shaped light-radiating members are disclosed in patent specifications U.S. Pat. No. 4,694,215 and U.S. Pat. No. 6,459,204 in which the curve of the U-turning is made very small, or a piece or pieces of cross connecting glass tubes are used, in this way the parallel luminous tube sections almost touch each other.

In both of the aforementioned documents the required light output is ensured by choosing the length and the number of the returning pairs of tubes properly. If the light-radiating member is made up of a number of parallel pairs of tubes then the end points and the starting points of the pairs (i.e. the vacuum space) are connected by a piece of cross-connecting glass tube. In this manner the light-radiating member having several branches or legs will form a continuous uninterrupted path and behaves as a single light-radiating member. The pairs of the light-radiating tubes are provided with tube portions serving as support means which are permanently secured into the housing containing the electronics.

U.S. Pat. No. 4,503,360 describes a compact fluorescent lamp unit in which the light-radiating member is made up of several freely guided straight tube sections with U-turns the straight sections being parallel with the longitudinal axis of the lamp, and only the two ends of the light-radiating member are connected to the support means and to the electronics. Although the mechanical force for fixing the light-radiating member is less in this case, the intensity of the emitted light is higher and more uniform because fewer portions of the light-radiating member are enclosed and shielded.

In U.S. Pat. No. 4,503,360 and U.S. Pat. No. 6,064,155 some aesthetic embodiments are disclosed in which a light transparent protective cover is used, but the covered sections of the light-radiating member is generally shaped and fixed in one of the manners previously described. The diameter of the through-hole of the pear-shaped or cylindriform or spherical envelope defines the largest outer diameter of the light-radiating member and vice versa. Accordingly, only a light-radiating member having a diameter not larger than the neck of the pear can be placed within a relatively large pear-shaped envelope. U.S. Pat. No. 6,064,155 uses a bulbous envelope which is made up of two parts, in this way the inner, covered structure can be larger than the diameter of the neck part, but in this case the two parts of the envelope must be secured to each other reliably.

A common disadvantage of the above solutions is that the light-radiating members of the compact fluorescent lamp obstruct the users in many ways. The long light-radiating member extending parallel with the longitudinal axis of the compact fluorescent lamp overhangs the edge of a conventional lamp-shade or globe therefore use of a compact fluorescent lamp is not pleasing aesthetically, the user may be blinded by the overhanging portion of the lamp, the light distribution is uneven and the lamp can not be fitted in certain closed lamp-shades or globes. In order to overcome these difficulties the diameter, the shape and the length of the tubes are varied in most cases.

In certain respect modifications in the shaping of the light-radiating member of the fluorescent lamp prove to be advantageous as it is described in U.S. Pat. No. 5,751,104, U.S. Pat. No. 5,243,256 and US 2002/0180352. Here, the tube sections carried back-and forth beyond the fixing points of the light-radiating member are partly interwound and form a double-coil helix shape along the superficies of a virtual cylinder or a sphere. Utilization of the space available is improved by varying the diameter of the light-radiating tube and the lead angle of the windings continuously. Though in this way the fluorescent lamp is similar to a conventional incandescent lamp with respect to its shape, but not with respect to its size and space requirements.

According to U.S. Pat. No. 3,899,712, U.S. Pat. No. 3,953,761 and U.S. Pat. No. 5,128,590 the intermediate space confined by the coiled tubes is used for placement of electronics (control gear; starter and/or ballast, etc.) which can be replaced in certain cases. A disadvantage of these solutions is that the light-radiating member still starts from a disc-like underplate fixed to the base, in this way—especially when the number of the tube sections is increased—the diameter of the underplate defines a wide neck part immediately after the base. The problem with the solution proposed in U.S. Pat. No. 6,064,155 is that the size of the component parts used here is very different from the typical size of the light-radiating members and electronics currently used. Industrial mass production of the compact fluorescent lamp described in this document is not feasible considering the presently available technology and machinery.

A compact fluorescent lamp whose size, shape and light output is equivalent to a conventional incandescent lamp (hereinafter called "conventional bulb") has not yet been developed. Although there are some conventional bulb like regular compact fluorescent lamp design today, those are available in the low ruminating (<55 Watt) and electrical (<11 Watt) power range only.

The object of the present invention is to provide a compact fluorescent lamp which can be equipped with a known base of any type, fixable in any direction and is closely equivalent to a conventional bulb in size, shape and light output according to the requirements. Also an object to provide a compact fluorescent lamp which is retrofit with conventional bulb sockets.

It has been realized that when the base, the housing containing the electronic and electrical elements (control gear; starter and/or ballast, etc.), and the light-radiating member are arranged in space sequential one after the other along the longitudinal axis of the compact fluorescent lamp, then the maximum overall length (MOL) of the compact fluorescent lamp is extended. Consequently if the component parts of the compact fluorescent lamp are rearranged in space, placed and designed properly, the maximum overall length (MOL) of the lamp can be made shorter according to the requirements.

In order to achieve the above object we provide a compact fluorescent lamp having a base known in itself, the compact fluorescent lamp contains a central hollow column the outer surface of which is coated with heat- and light-reflecting material, one end of the column is attached to the base; a cap for closing the other end of the hollow column; one or more light-radiating members secured to the hollow column closed with the cap; the light-radiating members start from the hollow column and are connected to electronic and electric elements (control gear; starter and/or ballast) and pass through the openings of the cap; the lamp further contains a guide ring to support the light-radiating members which extend until and/or beyond the meeting boundary edge of the base and the hollow column; the hollow column, the base, the cap and the guide ring are encompassed with the light-radiating members; and the light-radiating members extend from the cap towards the base and back in at least a direction parallel with the longitudinal axis of the compact fluorescent lamp and the light-radiating members have curved sections. This curved sections are necessary to provide a form similar to a conventional bulb or a form having an outskirting lower part around the lamp base.

A detailed description of some embodiments of the invention will now be disclosed with reference to the accompanying drawings in which.

Figure 1:
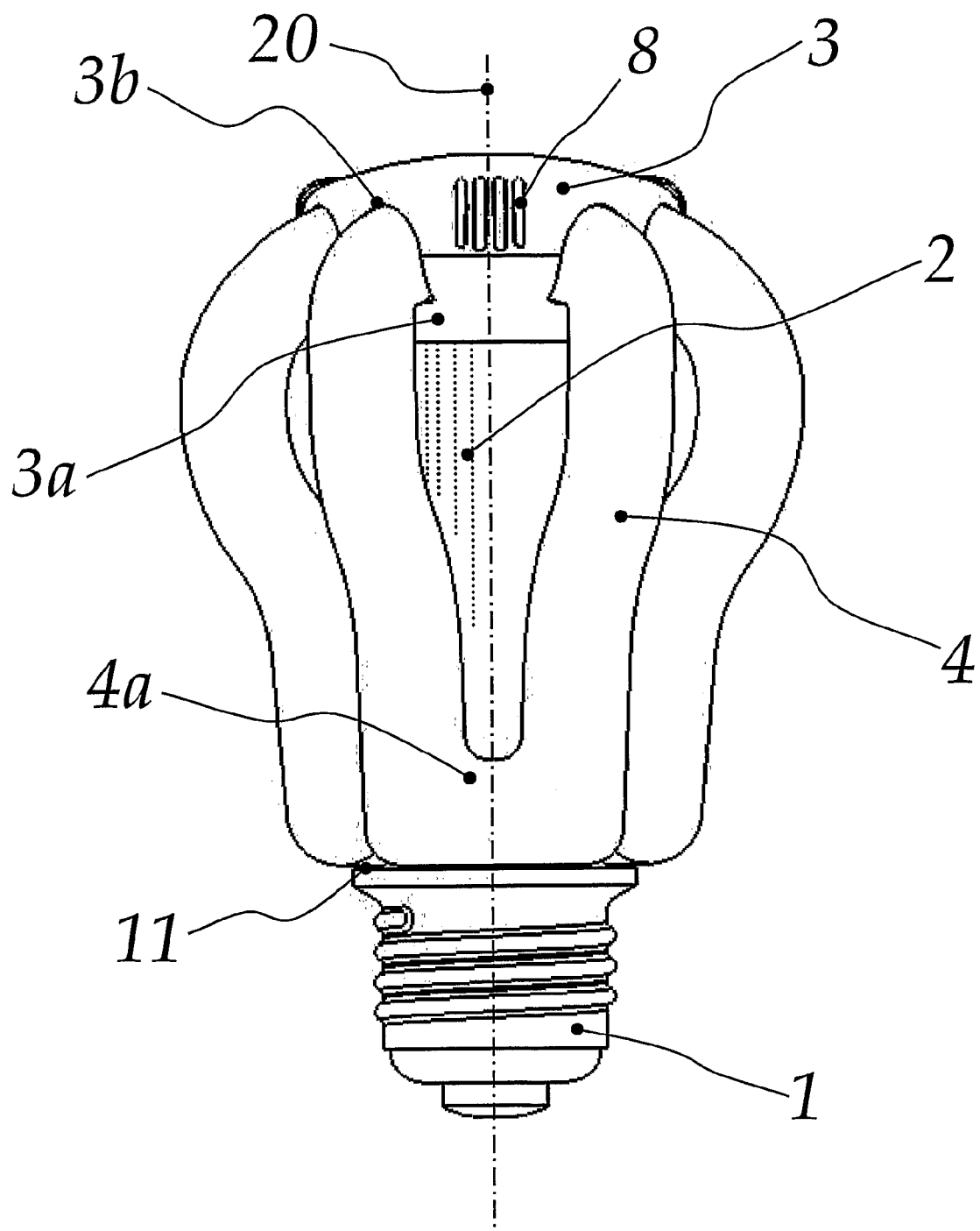
FIG. 1 is the front-view of a first embodiment of the compact fluorescent lamp according to the invention.

A first preferred embodiment of the compact fluorescent lamp according to the invention can be seen in FIGS. 1-4. One end/edge of a cylindriform hollow column 2 is attached to base 1. At the other end/edge of the hollow column 2 the space provided for connecting and securing one or more light-radiating members 4 is closed with a cap 3. The light-radiating member 4 is now identical to the discharge tube of a low-pressure discharge lamp. In this embodiment the bottom cover part 3a of cap 3 is attached to hollow column 2 and cap 3 itself can be attached to this bottom cover part 3a. Cap 3 (top cover) contains a window 6 in its centre. Electronic device 6a which is an operating circuit for supply and control of the lamp (e.g. control gear; starter and/or ballast; dimmer control, etc.) can be placed in the space enclosed with base 1, hollow column 2 and cap 3. For transmission of the control signal waves a suitable insertion 10 is used which fits into window 6. Typically, the light-radiating members 4 start from column 2 and extend along column 2 towards the base 1 and then back to the connecting points created at the cap 3. The light-radiating members 4 which extend until and/or beyond the meeting boundary edge of the base 1 and the hollow column 2 are supported by a guide ring 11. The light-radiating members 4 extend from the cap 3 and run outside of the hollow column 2 towards the base 1 and back parallel with the longitudinal axis 20 of the compact fluorescent lamp and are provided with curved sections 4a considering their full length. In respect of the present invention the term curved section is also used for sections where the end parts of two separate tube sections are joined using a small cross-connecting tube section, since it provides a path for the ionized medium, and ensures light radiation equivalent to a curve.

Figure 3A:
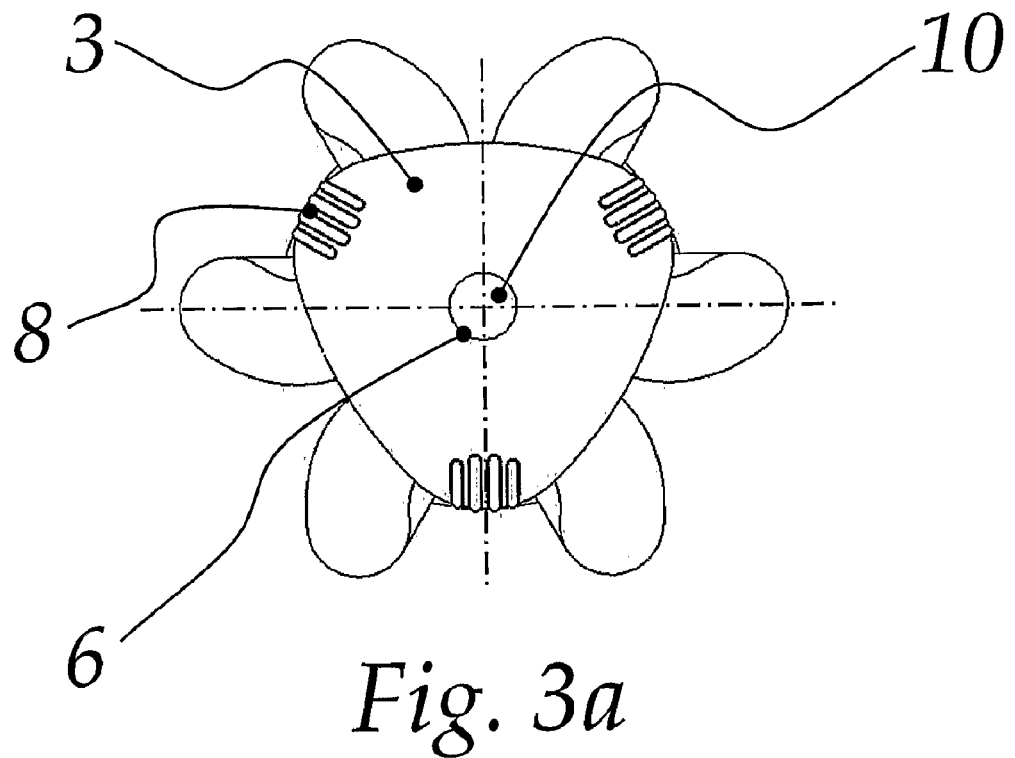
FIG. 3a is the top-view of the lamp of FIG. 1.
Figure 3B:
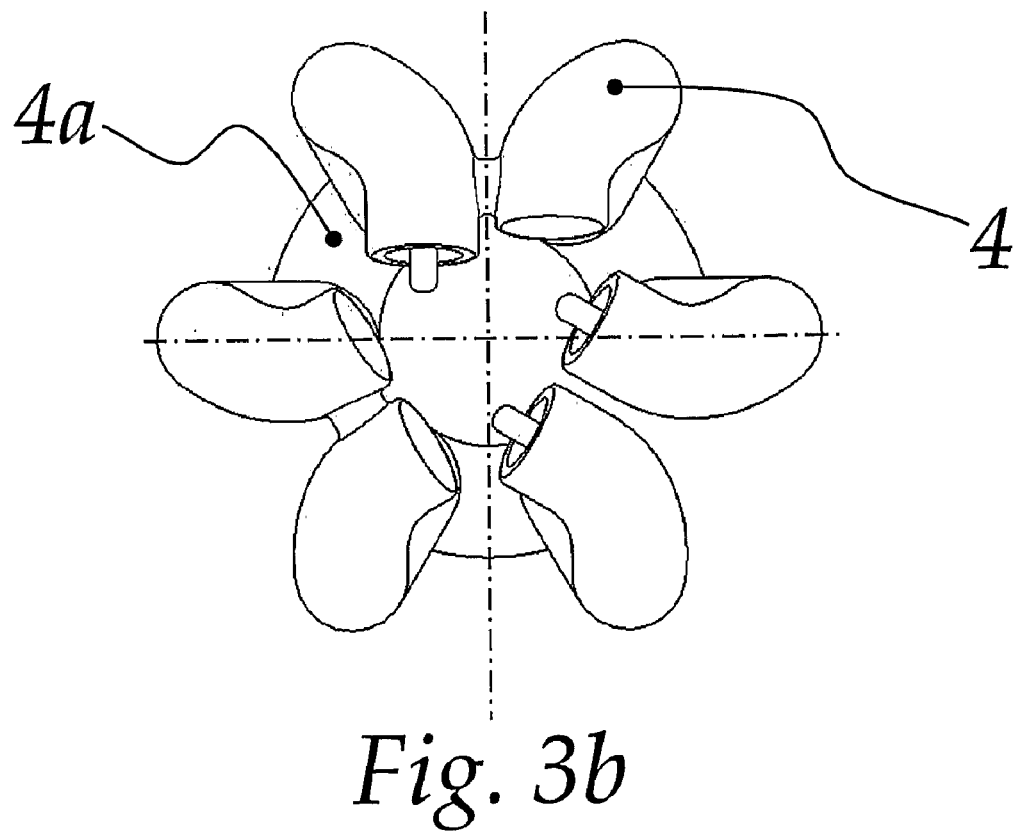
FIG. 3b is the top view of the light-radiating member of the first embodiment of the compact fluorescent lamp according to the invention.

FIG. 3a is the top-view of the lamp according to the first embodiment of the invention in which the connecting points are covered with cap 3 and FIG. 3b is the top-view of the same lamp without cap 3, hollow column 2 and base 1 showing the connecting end parts of the light-radiating members 4.

Figure 4:
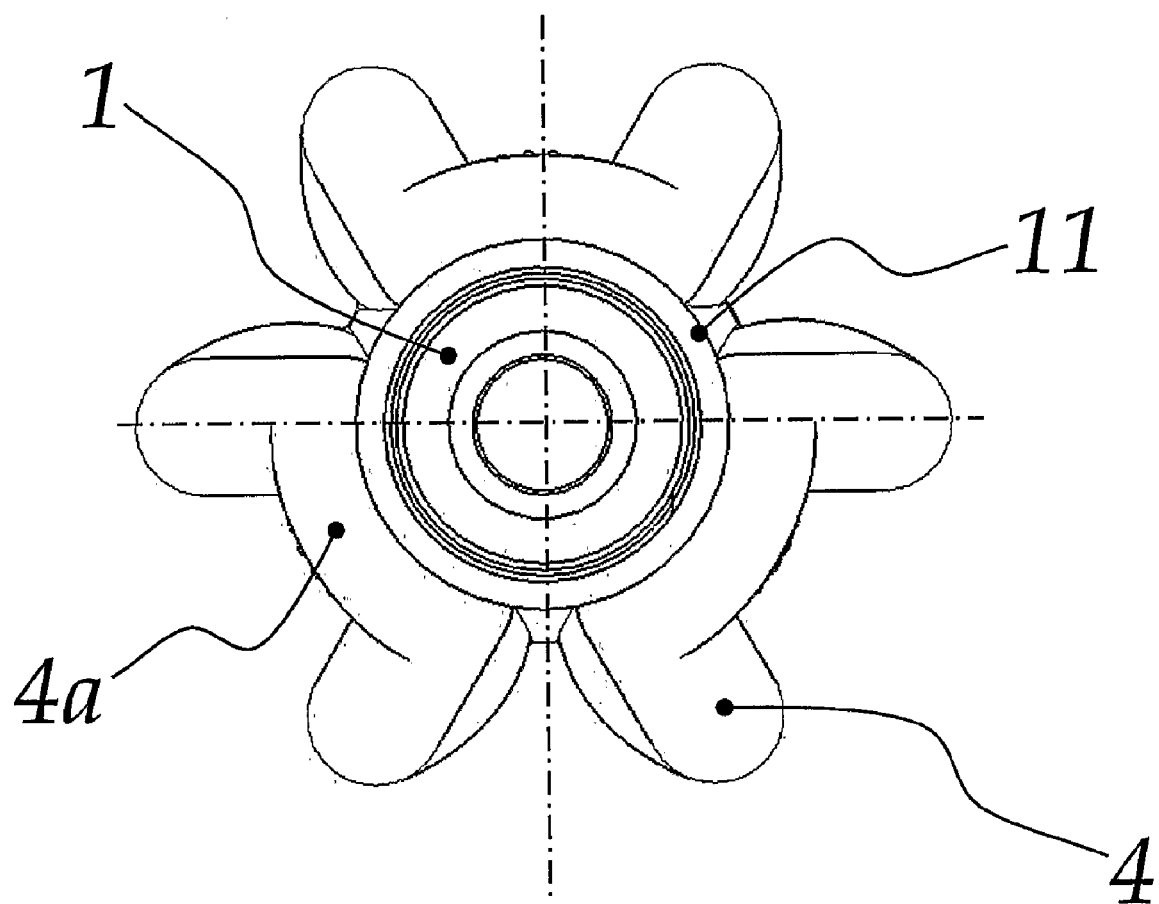
FIG. 4 is the bottom-view of the lamp of FIG. 1.
Figure 5:
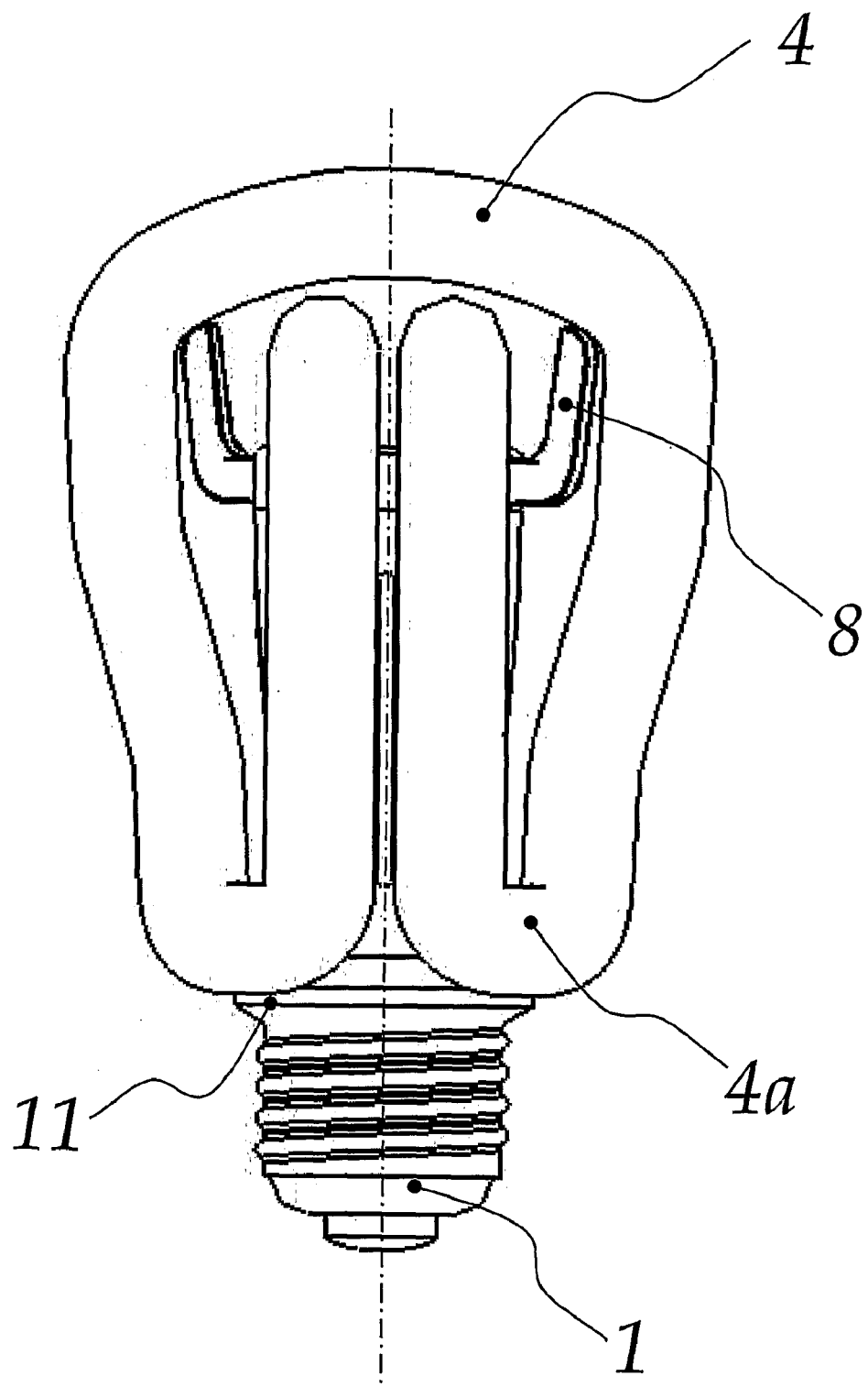
FIG. 5 is the front view of a second embodiment of the compact fluorescent lamp according to the invention.
Figure 6:
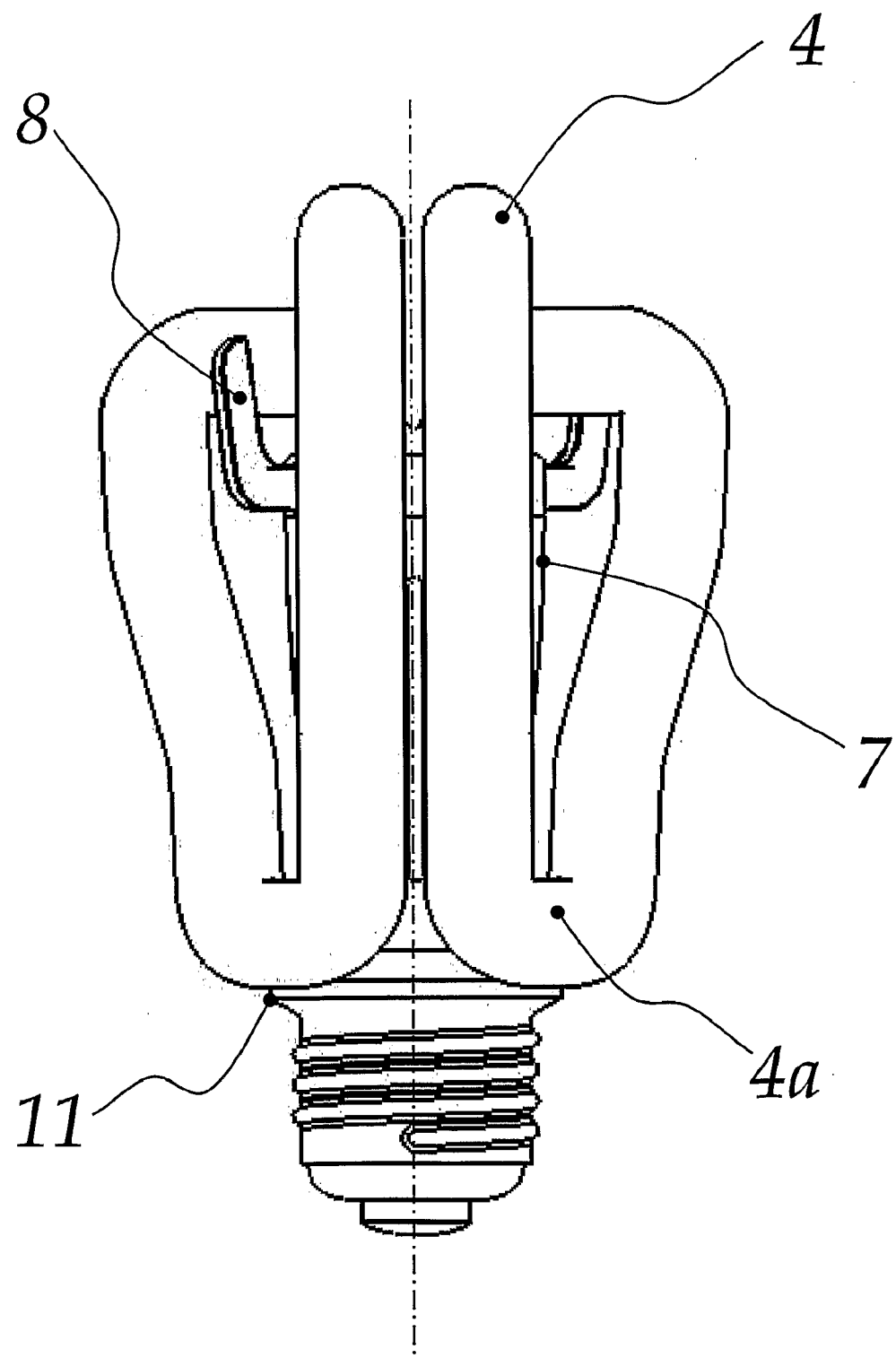
FIG. 6 is the side-view of the compact fluorescent lamp of FIG. 5.

FIG. 4 is the bottom-view of the lamp according to the invention when viewed from the base 1.

It is to be noted that both cap 3 and guide ring 11 may be made of visible light transparent material in order to enhance the effective light output.

Figure 2:
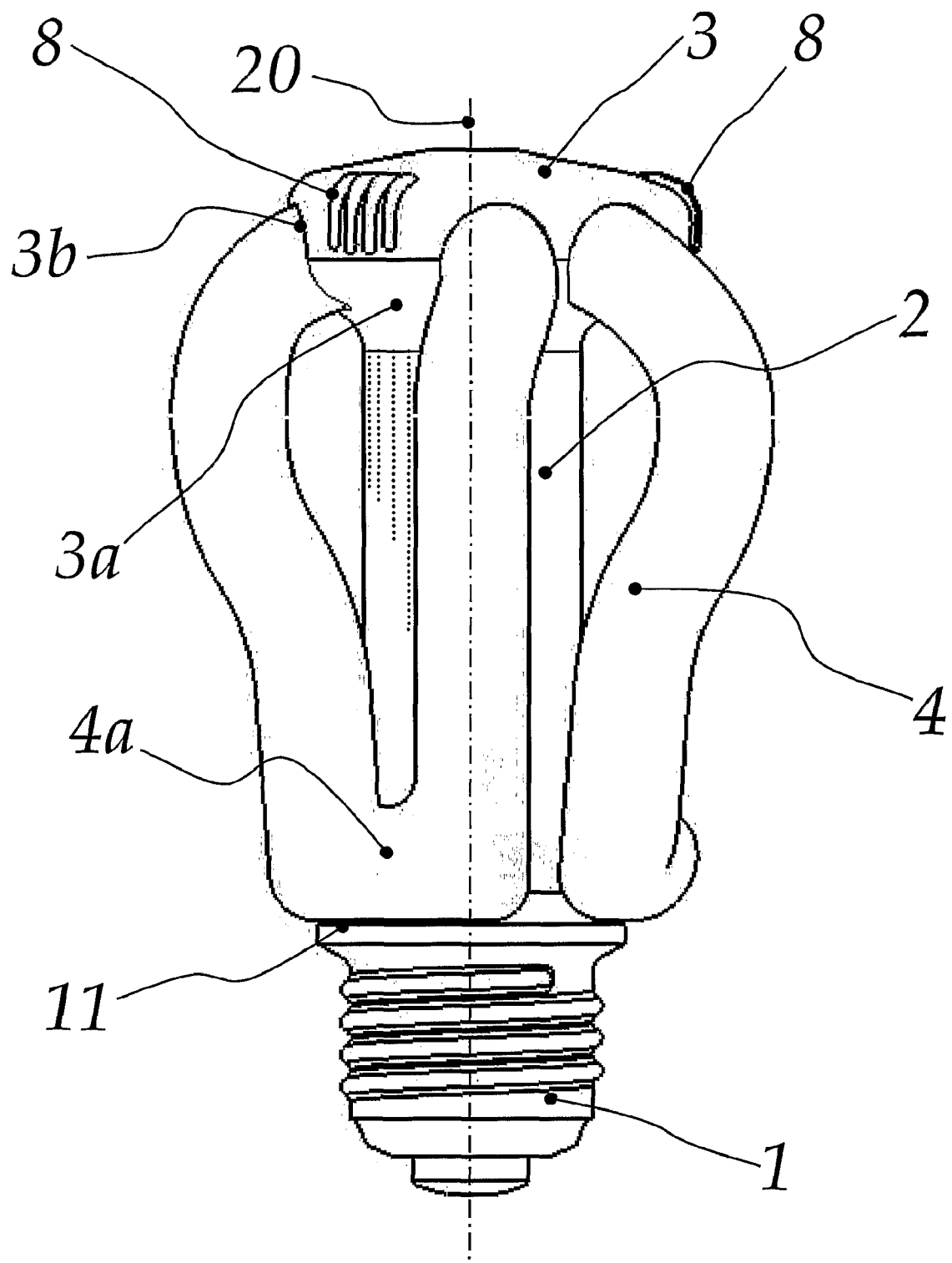
FIG. 2 is the side-view of the compact fluorescent lamp of FIG. 1.

As it is shown in FIGS. 1, 2 and 3, cap 3 is provided with driving means 8 which make fixing or unfixing of the lamp safer. In this embodiment the driving means 8 are formed as ribbing. When screwing in or off a conventional bulb the user must grasp the glass envelope. An accidental breaking of the glass envelope and a possible electric shock endanger the life or health of the user. The presently existing compact fluorescent lamps can be fixed or unfixed in a similar way, by grasping the fluorescent tube. This can be dangerous because the user may break the glass tube itself or break its fixing. Due to the arrangement of the component parts of the compact fluorescent lamp according to the invention it is possible to provide a driving means 8 by means of which fixing and unfixing of the lamp becomes safer by driving a hand applied torque through the hollow column 2 to the base 1.

In FIGS. 5-9 another embodiment of the compact fluorescent lamp according to the invention can be seen. As it is shown in the Figures, a pair of tubes of the light-radiating member(s) 4 are bent over the cap 3. In this manner the intensity of the emitted light along the longitudinal axis of the lamp is increased.

Figure 7:
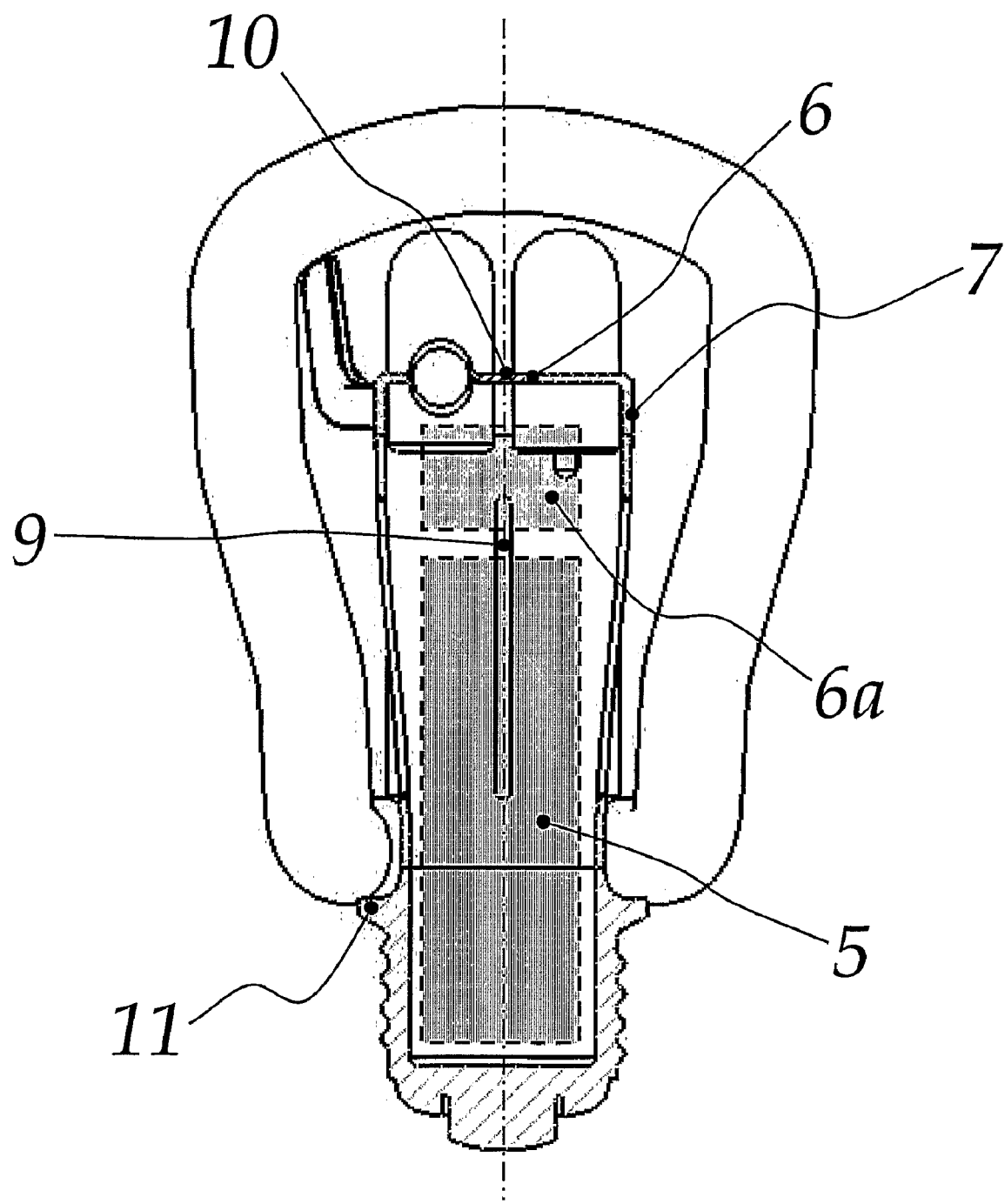
FIG. 7 shows the principal section of the lamp of FIG. 5.
Figure 8:
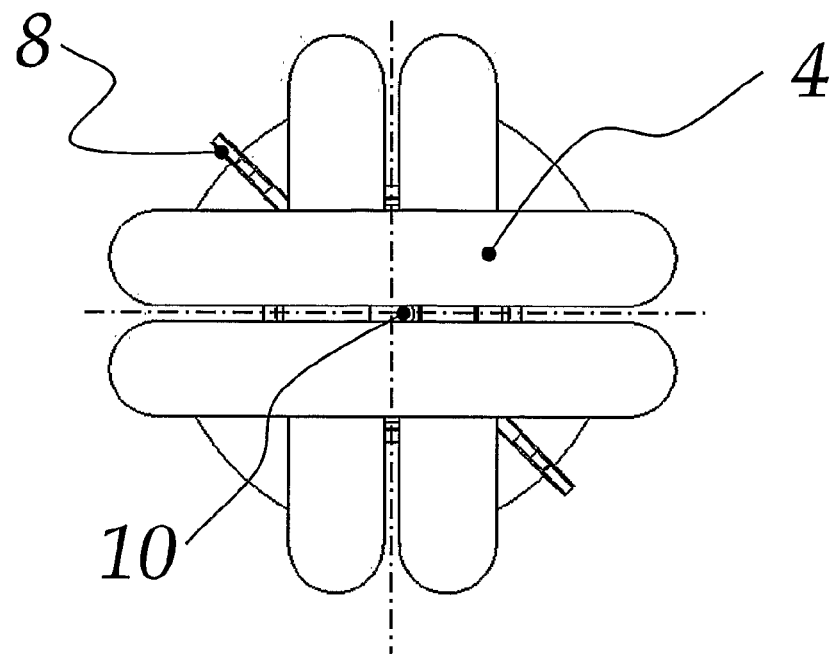
FIG. 8 is the top-view of the lamp of FIG. 5.
Figure 9:
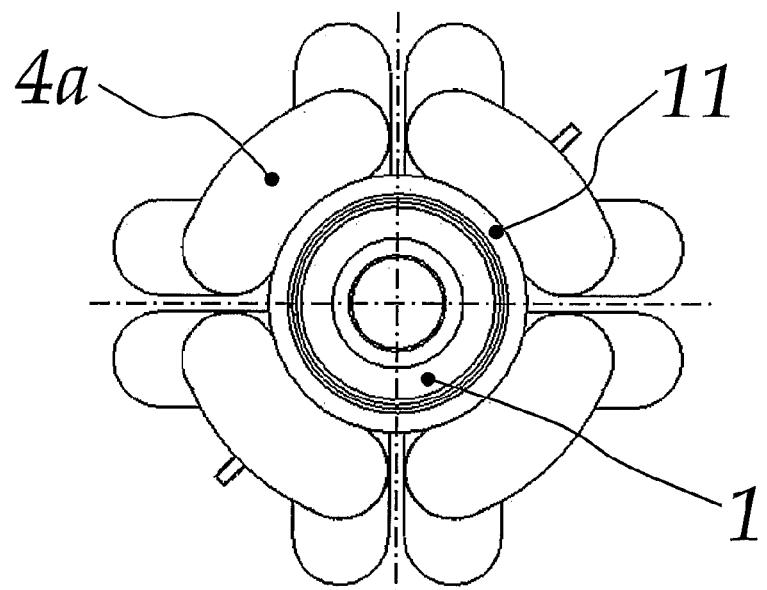
FIG. 9 is the bottom-view of the lamp of FIG. 5.

FIG. 7 schematically shows the outlines of the electronic and electric elements 5 disposed advantageously in the space closed by base 1, column 2 and cap 3. Also in FIG. 7 cooling apertures 9 formed on the shell of the hollow column 2 are shown. Still in this Figure a window 6 formed for operation of an electronic control unit 5 and/or a signal detecting detector 6a can be seen. Window 6 contains an insertion 10 which makes transmission of signals to the electronic control unit 5 and/or detector 6a placed behind possible. In this manner the compact fluorescent lamp according to the invention can be remote controlled—independently of the electric network—directly and/or indirectly (e.g. control gear; starter and/or ballast; dimmer, direct on/off switch, etc.) or even reception of an audio and/or video signal is feasible (CCD sensor, microphone, etc.). The signal may be an optical or a radio-frequency signal as well.

As it can be seen in FIGS. 1-3 and 5-14 cap 3 may be provided with handles or arms which serve as driving means 8.

Figure 10:
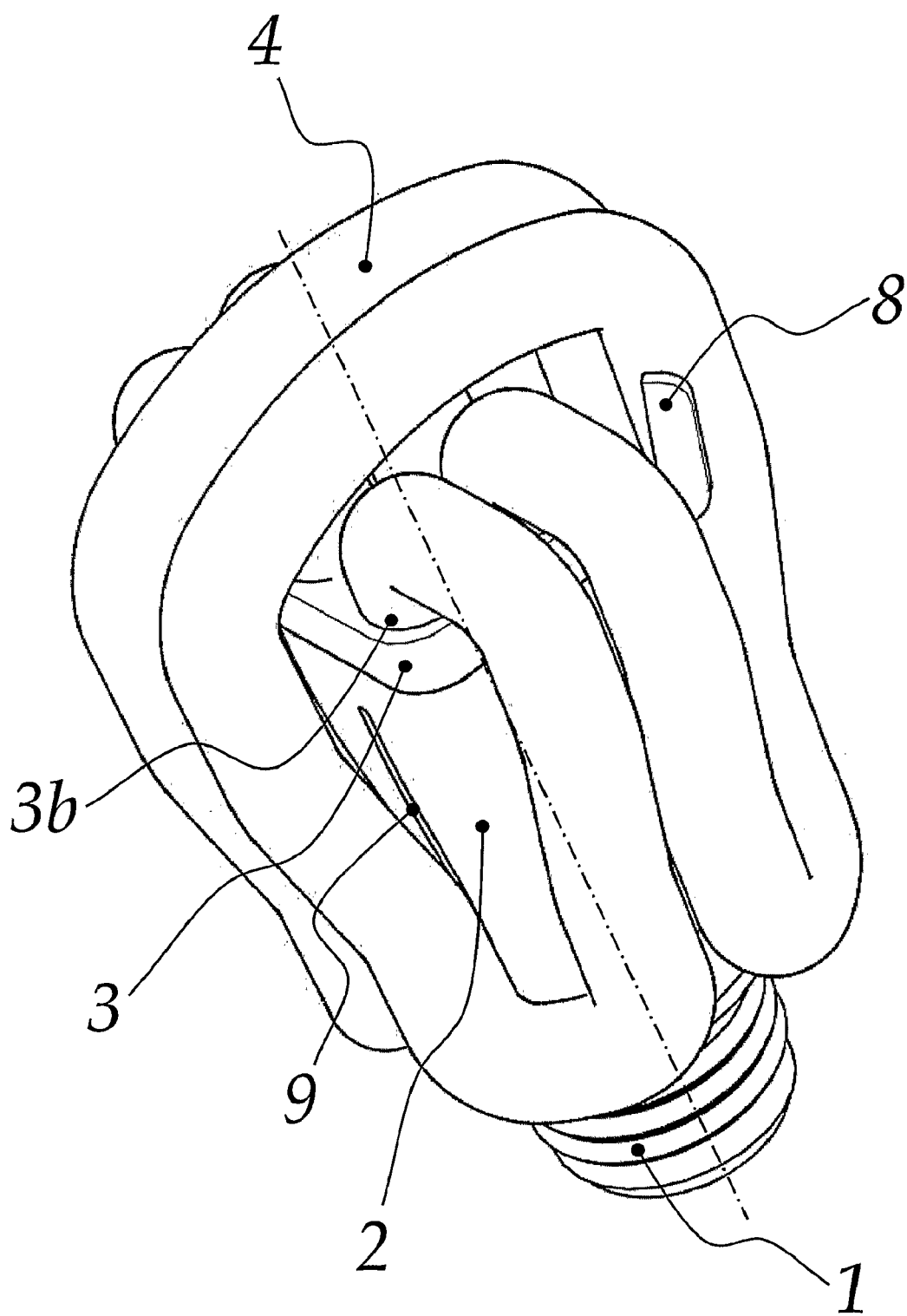
FIG. 10 is a perspective view of the lamp of FIG. 5.

FIG. 10 shows the perspective view of the lamp according to FIGS. 5-9. As it can be seen in FIG. 10 the sectional outline of the hollow column 2 can be not only cylindriform but square or rectangular as well.

Figure 11:
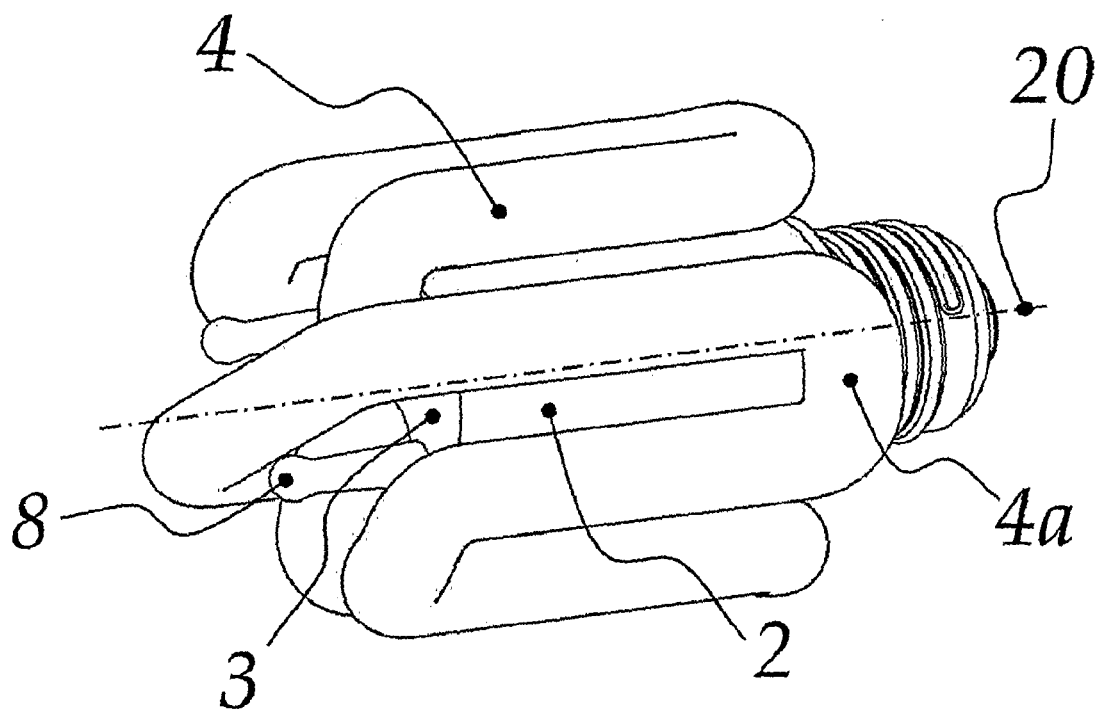
FIGS. 11-13 are perspective views of lamps similar to the second embodiment of the invention and FIG. 14 is the perspective view of a third embodiment of the compact fluorescent lamp according to the invention.
Figure 12:
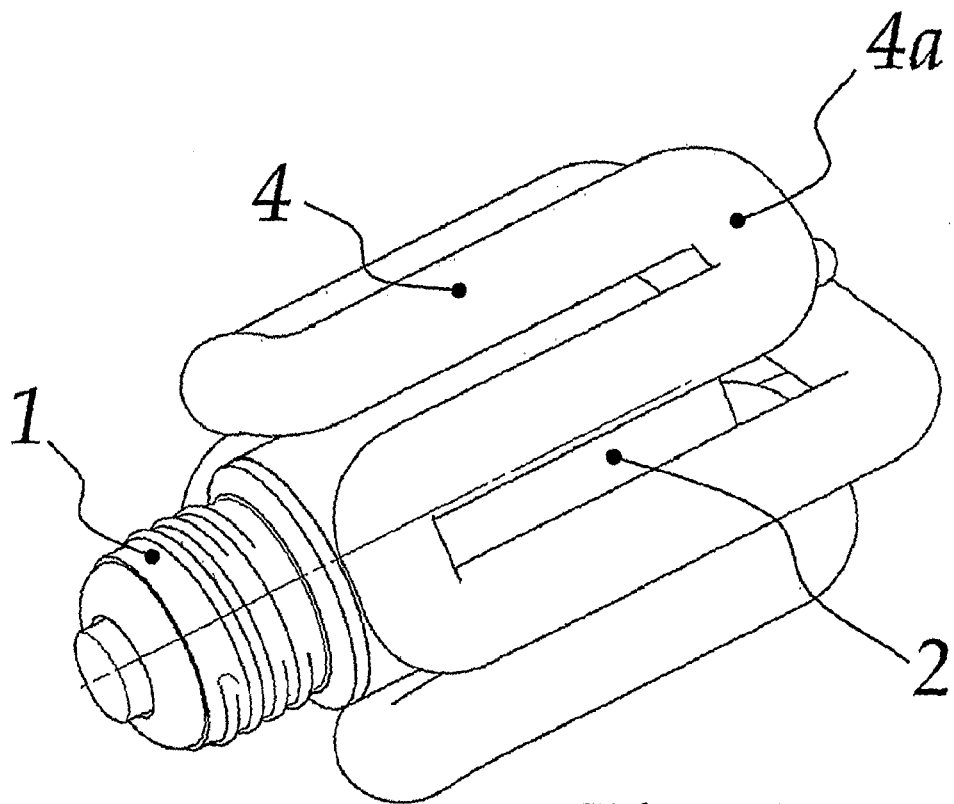

A possible embodiment of the compact fluorescent lamp according to the invention is shown in FIGS. 11 and 12. In this embodiment the length of the light-radiating member 4 is at least 890 mm, while the maximum overall length (MOL) of the compact fluorescent lamp is not more than 120 mm, in this way the specific light output proportionate to the lamp surface is outstanding.

Figure 13:
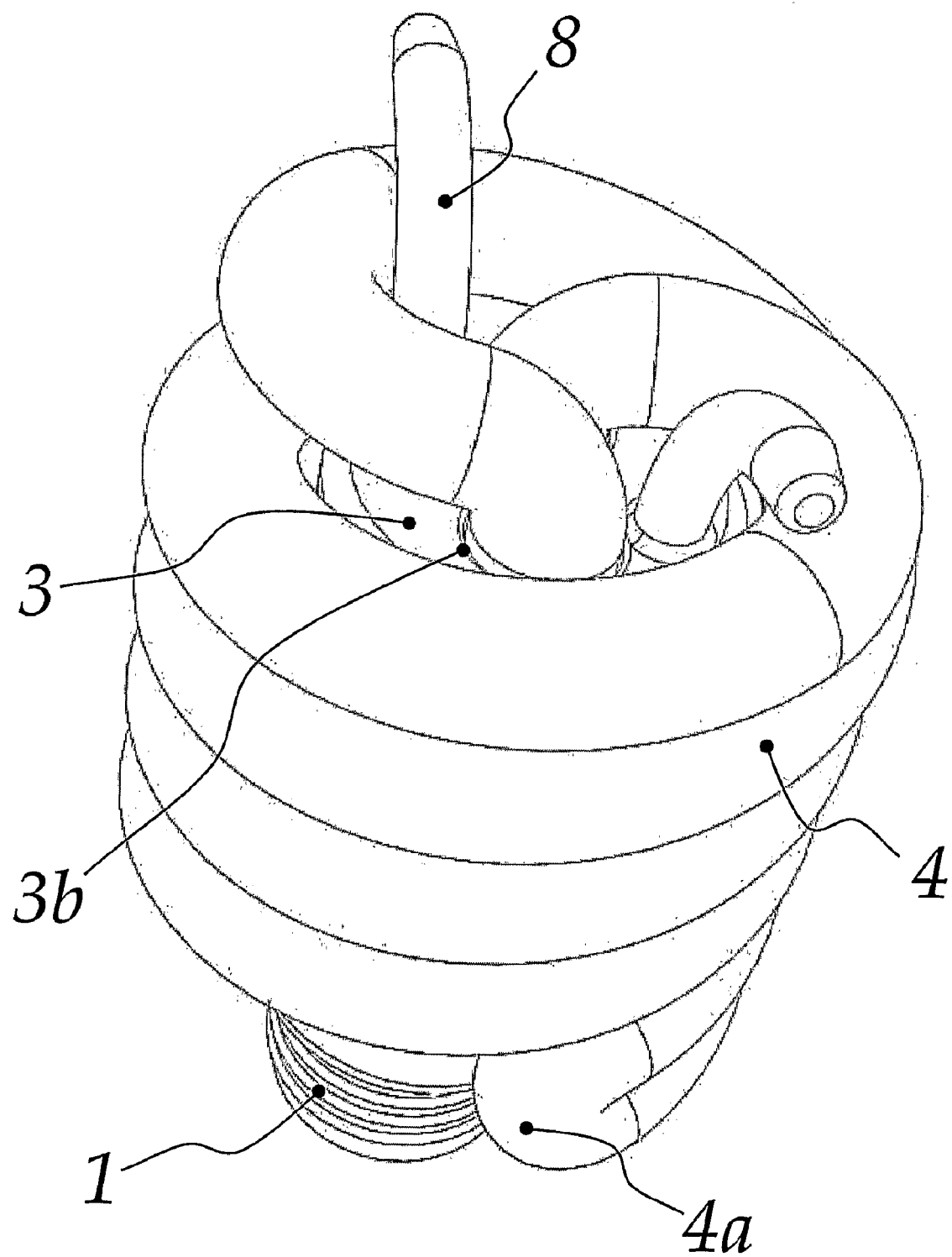
Figure 14:
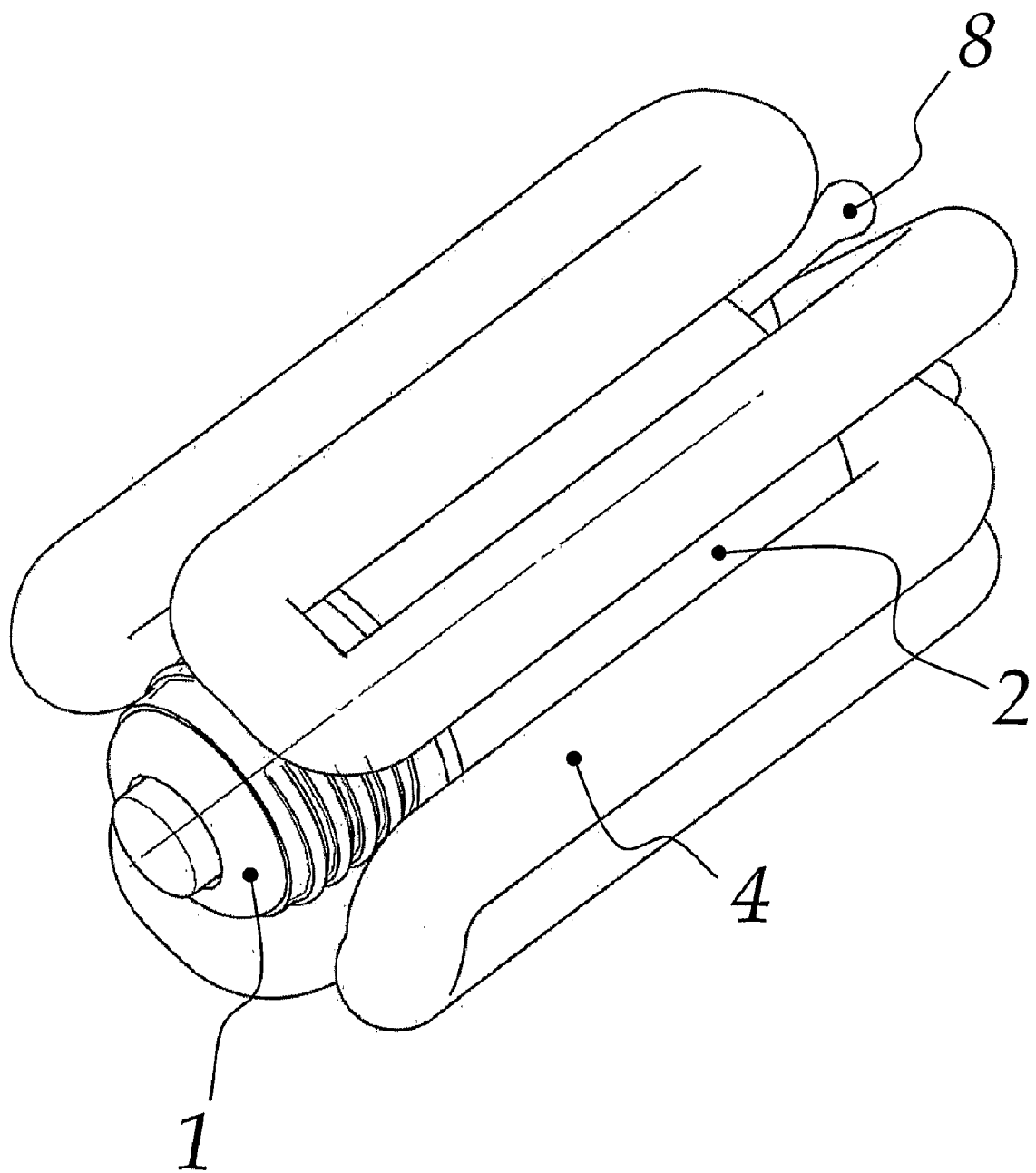

In FIG. 13 another advantageous embodiment of the compact fluorescent lamp according to the invention is shown in which the length of the helical light-radiating member 4 is about 935 mm, while the maximum overall length (MOL) of the compact fluorescent lamp is less than 120 mm.

Heat- and light-reflecting surface 7 of hollow column 2 is shown only symbolically in the Figures. This reflecting surface has double function: on the one hand it protects the electronic and electric elements 5 and/or 6a operating within hollow column 2 from the heat generated by the light-radiating member 4 when the lamp is in use, on the other hand it reflects the light radiated by the light-radiating members 4 towards each other and/or hollow column 2 into the area to be illuminated.

The advantage of the compact fluorescent lamp according to the present invention is that the maximum overall length (MOL) of the lamp is reduced significantly without reducing its light output, thereby it does not overhang disturbingly a lamp-shade or globe designed for conventional bulb usage. It can be used in various kinds of existing lighting units (reading lamps, wall brackets, electroliers, antique lamps, etc.) designed for incandescent-type lamps without modifying them as the size (the maximum overall length (MOL) and the maximum outer diameter) of the compact fluorescent lamp according to the invention corresponds to the size of a conventional bulb.

The length of the light-radiating member of a compact fluorescent lamp also determines the light output of the compact fluorescent lamp.

Nowadays the length of the light-radiating member of an approximately 20 W compact fluorescent lamp with a light output equivalent to a 100 W incandescent lamp is at least 600 mm. According to the present invention the light-radiating member can be made short (FIG. 5) or long (FIGS. 11-14), as required. FIG. 12 shows a preferred embodiment of the compact fluorescent lamp according to the invention. Here the lamp is provided with a light-radiating member 4 which has simple bends and parallel straight sections. Production of this lamp is cost-effective. Further, each of the lamps according to FIGS. 1-13 may be provided with a light-radiating member 4 formed in a manner shown in FIG. 14. As it can be seen in FIG. 14 the light-radiating member 4 overhangs the meeting boundary edge of base 1 and column 2 like a skirt. In this way light can be emitted also from the overhanging portion of the light-radiating member 4. Even a conventional bulb does not capable to achieve the same. The overhanging light-radiating member 4 can be formed according to specifications so that it does not collide with the component parts of a standard lighting unit (e.g.: socket, lamp-shade, fixtures, etc.).

Regarding their size and the available production technology, the light-radiating members 4 of the compact fluorescent lamp according to the invention meet the requirements of the fluorescent lamp industry.

The invention is not limited to the examples disclosed in the present description, the shape, the orientation as well as the connecting and fixing points of the light-radiating member 4 may be varied within the scope of the invention.

The invention claimed is:

1. A compact fluorescent lamp having a base (1), light-radiating members (4), electronic and electric elements (5), characterized in that the compact fluorescent lamp comprises a hollow column (2), the outer surface of which is coated with heat- and light-reflecting material (7), the hollow column (2) is attached to the base (1); a cap (3) closing the hollow column (2); one or more of the light-radiating members (4) are secured to the cap (3) and/or the hollow column (2); the light-radiating members (4) start from the hollow column (2) and are connected to the electronic and electric elements (5) and/or to the signal detecting detector (6a); and pass through openings (3b) of the hollow column and/or the cap (3); the compact fluorescent lamp further comprises a guide ring (11) to support the light-radiating members (4) extending until or beyond the meeting boundary edge of the base (1) and the hollow column (2); the hollow column (2), the base (1), the cap (3) and the guide ring (11) are encompassed with the light-radiating members (4) and the light-radiating members (4) extend from the cap (3) towards the base (1) and back, in at least a direction parallel with the longitudinal axis (20) of the compact fluorescent lamp and the light-radiating members (4) have curved sections (4a).

2. Compact fluorescent lamp according to claim 1, characterized in that an electronic control unit (5) and one or more signal detecting detectors (6a) is disposed in the hollow column (2) and/or in the cap (3); the hollow column (2) and/or the cap (3) is provided with a window (6) containing an insertion (10) enabling transmission of signal waves detectable by the signal detecting detector (6a).

3. Compact fluorescent lamp according to claim 1 or 2, characterized in that it is provided with a driving means (8) by use of which the compact fluorescent lamp can be installed into a lamp socket or can be removed from the same without grasping any of the light-radiating members (4).

4. Compact fluorescent lamp according to claim 3, characterized in that the electronic and electric elements (5) and/or signal detecting detector (6a) forming an operating circuit are disposed in a space enclosed with the base (1), the hollow column (2) and the cap (3).

5. Compact fluorescent lamp according to claim 2, characterized in that the insertion (10) is adapted for transmission of an optical or radio-frequency signal waves.

6. Compact fluorescent lamp according to claim 4 characterized in that cooling apertures (9) are formed on the base (1) and/or on the hollow column (2) and/or on the cap (3).

7. Compact fluorescent lamp according to claim 1 characterized in that the cap (3) and/or the guide ring (11) are made of visible light transparent material.

* * * * *